United States Patent
Kakade et al.

(10) Patent No.: US 9,676,248 B2
(45) Date of Patent: Jun. 13, 2017

(54) SYSTEM AND METHOD FOR COMPENSATING FOR SOLAR LOAD

(71) Applicant: GM GLOBAL TECHNOLOGY OPERATIONS LLC, Detriot, MI (US)

(72) Inventors: Rupesh S. Kakade, New Panvel Raigad (IN); Prashant Mer, Rajkot (IN); Todd M Tumas, Taylor, MI (US); Vish S. Iyer, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 244 days.

(21) Appl. No.: 14/047,684

(22) Filed: Oct. 7, 2013

(65) Prior Publication Data

US 2015/0096733 A1    Apr. 9, 2015

(51) Int. Cl.
*B60H 1/00* (2006.01)

(52) U.S. Cl.
CPC ....... *B60H 1/0075* (2013.01); *B60H 1/00878* (2013.01)

(58) Field of Classification Search
CPC .......................... B60H 1/0075; B60H 1/00878
See application file for complete search history.

(56) References Cited

U.S. PATENT DOCUMENTS

| | | | | |
|---|---|---|---|---|
| 4,978,061 A | * | 12/1990 | Ogihara | B60H 1/00828 236/49.3 |
| 5,027,611 A | * | 7/1991 | Doi | B60H 1/0075 165/202 |
| 5,553,661 A | | 9/1996 | Beyerlein et al. | |
| 5,860,593 A | * | 1/1999 | Heinle | B60H 1/0075 165/204 |
| 6,012,297 A | * | 1/2000 | Ichishi | B60H 1/00871 165/203 |
| 6,170,274 B1 | * | 1/2001 | Ichishi | B60H 1/345 236/49.3 |

(Continued)

FOREIGN PATENT DOCUMENTS

| | | |
|---|---|---|
| CN | 201497569 U | 6/2010 |
| DE | 19617562 C1 | 5/1997 |

(Continued)

OTHER PUBLICATIONS

Radosavljevic, J. et al., 'Defining of the Intensity of Solar Radiation on Horizontal and Oblique Surfaces on Earth', Facta Universitatis: Working and Living Environmental Protection, vol. 2, No. 1, Nov. 15, 2001, pp. 77-86. [retrieved on Jul. 11, 2016]. Retrieved from the Internet: <URL:http://facta.junis.ni.ac.rs/walep/walep2001/walep2001-09.pdf>.*

(Continued)

*Primary Examiner* — Ljiljana Ciric
(74) *Attorney, Agent, or Firm* — Lorenz & Kope, LLP

(57) ABSTRACT

Vehicles and methods for controlling climate control systems may include, but are not limited to at least one seat, a climate control system, and a controller communicatively coupled to the climate control system, wherein the controller is configured to calculate a directional sun effect for each of the at least one seats, and modify at least one of an airflow, a temperature and air distribution of the climate control system based upon the calculated directional sun effect for each of the at least one seats.

11 Claims, 8 Drawing Sheets

(56) References Cited

U.S. PATENT DOCUMENTS

| | | | |
|---|---|---|---|
| 6,575,378 B2* | 6/2003 | Aoki | B60H 1/0075 236/49.3 |
| 7,143,590 B2* | 12/2006 | Tomita | B60H 1/00735 62/126 |
| 7,156,168 B2 | 1/2007 | Gutbrod et al. | |
| 7,191,611 B2* | 3/2007 | Hatakeyama | B60H 1/00735 165/42 |
| 7,380,587 B2* | 6/2008 | Naruse | B60H 1/00028 165/202 |
| 8,744,673 B2* | 6/2014 | Shiroyama | B60H 1/0075 236/91 E |
| 2002/0125332 A1 | 9/2002 | Aoki et al. | |
| 2003/0136854 A1 | 7/2003 | Aoki et al. | |
| 2003/0226658 A1 | 12/2003 | Tsunoda | |
| 2004/0089006 A1* | 5/2004 | Kamiya | B60H 1/00028 62/244 |
| 2009/0165841 A1* | 7/2009 | Gunn, Jr. | F24J 2/38 136/245 |
| 2010/0212880 A1* | 8/2010 | Ripoll | B60H 1/00878 165/287 |
| 2011/0030285 A1* | 2/2011 | Kaufman | E04H 6/025 52/82 |

FOREIGN PATENT DOCUMENTS

| | | |
|---|---|---|
| DE | 10246244 A1 | 4/2004 |
| EP | 2332757 A1 | 6/2011 |

OTHER PUBLICATIONS

State Intellectual Property Office of the People's Republic of China, Office Action in Chinese Patent Application No. 201410519677.6 mailed Sep. 29, 2016.

German Patent and Trade Mark Office, Office Action for German Patent Application No. 10 2014 113 7671 mailed Feb. 4, 2016.

* cited by examiner

SYSTEM AND METHOD FOR COMPENSATING FOR SOLAR LOAD

TECHNICAL FIELD

The technical field generally relates to climate control systems, and more particularly relates to automatic climate control systems which compensate for solar exposure.

BACKGROUND

Automatic climate control systems are becoming more prevalent in vehicles. Such systems attempt to regulate the temperature inside the vehicle to a temperature set by the user. Generally these climate control systems determine a temperature and an airflow required to regulate the temperature based upon a lookup table which has to be tuned based upon iterative vehicle tests. The tuning can be subjective and may not accurately control the temperature.

SUMMARY

In one embodiment, for example, a vehicle is provided. The vehicle may include, but is not limited to at least one seat, a climate control system, and a controller communicatively coupled to the climate control system, wherein the controller is configured to, calculate a directional sun effect for each of the at least one seats, and modify at least one of an airflow, a temperature and an air distribution of the climate control system based upon the calculated directional sun effect for each of the at least one seats.

In another embodiment, for example, a method for controlling an automatic climate control system in a vehicle comprising at least one seat is provided. The method may include, but is not limited to calculating, by a processor, a directional sun effect for each of the at least one seats, and modifying, by the processor, at least one of an airflow, a temperature and an air distribution output by the automatic climate control system based upon the calculated directional sun effect for each of the at least one seats.

In yet another embodiment, for example, a climate control system is provided. The climate control system may include, but is not limited to a heating system, an air conditioning system, and a controller communicatively coupled to the climate control system, wherein the controller is configured to calculate a directional sun effect for at least one seat, and modify at least one of an airflow, a temperature and an air distribution output from one of the heating system and the air conditioning system based upon the calculated directional sun effect for each of the at least one seats.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As discussed above, conventional automatic climate control systems are tuned based upon iterative subjective tests. Accordingly, conventional automatic climate control systems do not accurately compensate for the actual solar load on the occupants of the vehicle. In other words, the occupant of the vehicle, when the sun is directly shining on the occupant, may not experience a set temperature because the conventional system does not accurately take into account where the sun is shining through various windows of the vehicle and how that may affect the temperature experienced by the occupant. Accordingly, as discussed in further detail below, a vehicle is provided with a climate control system which calculates the actual solar load on the interior of the vehicle and modifies the temperature, airflow and air distribution output by the climate control system to compensate for the solar load in the vehicle.

Figure 1:
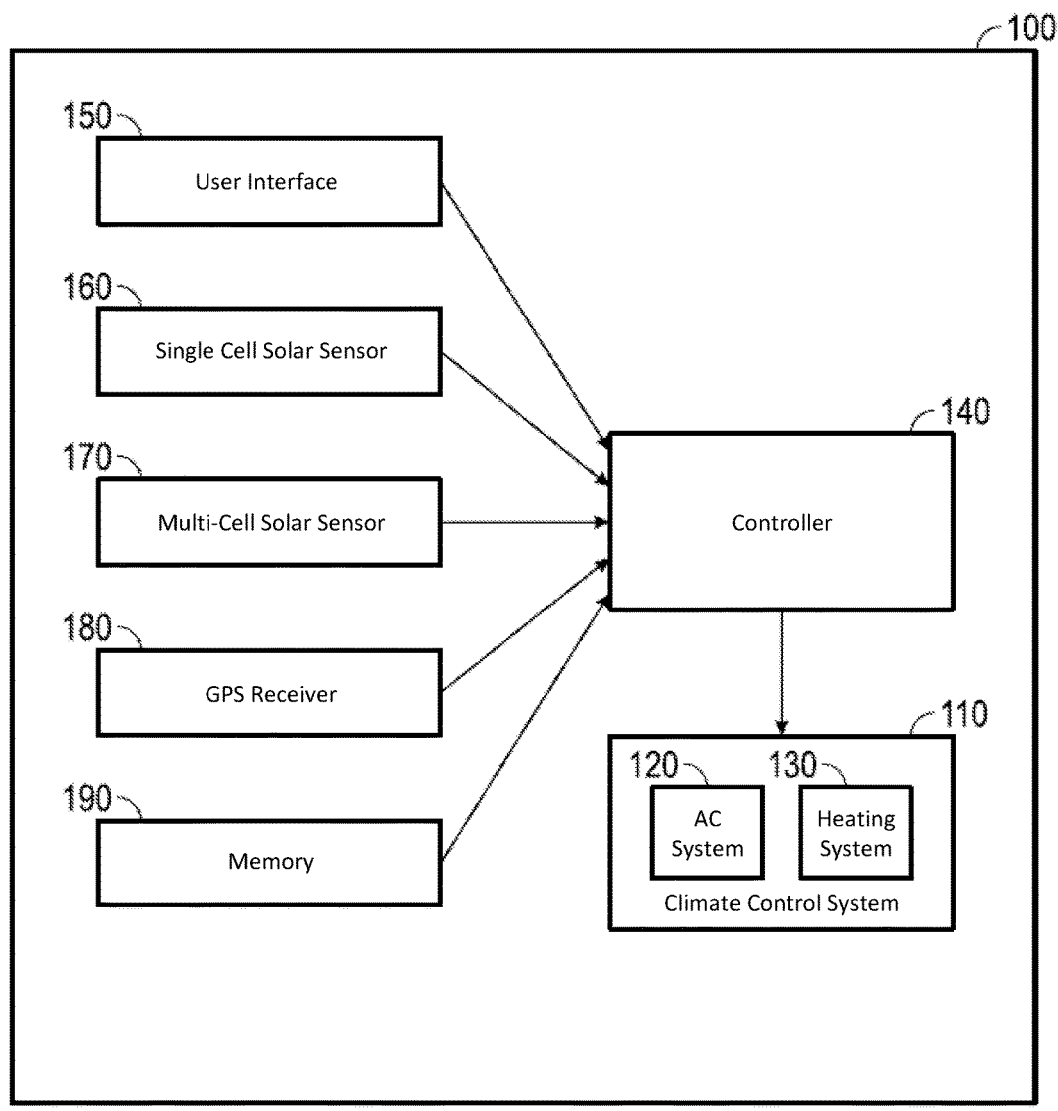
FIG. 1 is a block diagram of an exemplary vehicle, in accordance with an embodiment.

FIG. 1 is a block diagram of an exemplary vehicle 100, in accordance with an embodiment. The vehicle 100 may be an automobile, an aircraft, a spacecraft, a watercraft or any other type of vehicle that utilizes heating and/or cooling systems. The vehicle includes a climate control system 110. The climate control system 110 includes an air conditioning system 120 to provide cooled air to the interior of the vehicle 100 and a heating system 130 to provide warmed air to the interior of the vehicle 100. The air conditioning system 120 and heating system 130 of the climate control system 110 may include, but are not limited to, at least one air delivery motor, at least one blower motor, at least one heat exchanger, a compressor, at least one thermal expansion valve, and at least one coolant pump, and a variety of piping and exhaust vents to provide cooled air to the interior of the vehicle 100.

The climate control system 110 further includes a controller 140 for controlling the climate control system 110, as discussed in further detail below. The controller 140 may include a microprocessor, a microcontroller, an application specific integrated circuit, a field programmable gate array, a physics processing unit, a graphics processing unit, or any other type of logic device or combination thereof. The controller 140 may be shared by other systems in the vehicle 100 or may be specific to the climate control system 110.

The controller 140 receives input from a user interface 150. The user interface 150 may be mounted on a dashboard of the motor vehicle (not illustrated) or provided on the smart phones or the other smart devices of a user (not illustrated) and provide a user with controls for the climate control system 110. In one embodiment, for example, the climate control system 110 may be an automatic climate control system where a user sets a temperature for the vehicle 100 via the user interface 150 and the controller 140 controls the climate control system 110 to maintain the selected temperature. The user interface 150, for example, may allow a user to set a different temperature for different zones of the vehicle. Some climate control systems 110, for example, may allow for different temperature settings between a driver and a passenger. In other embodiments, for example, the climate control systems 110 may also have a different zone for the left side of the vehicle, the right side of the vehicle, each individual row of the vehicle or any combination thereof.

The controller 140 may receive input from a single-cell solar sensor 160 otherwise known as a single zone solar sensor. The single-cell solar sensor 160 includes one photo-diode which outputs a voltage corresponding to an intensity of solar rays from the sun hitting the single-cell solar sensor 160. In one embodiment, for example, the voltage output from the single-cell solar sensor 160 may correspond to the solar intensity in units of watts per square meter. Sensor voltage is compensated when the solar sensor is not directly exposed to solar rays by the cumulative moving average of the sampled sensor data for a predefined period of time. Cumulative moving average of the solar sensor voltage is eventually equal to the current sensor voltage, when the solar sensor is not directly exposed to solar rays for an extended period of time.

In another embodiment, for example, the controller 140 may receive input from a multi-cell solar sensor 170, otherwise known as a multi-zone solar sensor. The multi-cell solar sensor 170 includes multiple photo-diodes, each outputting a voltage corresponding to an intensity of solar rays from the sun hitting the respective photo-diode in the multi-cell solar sensor 170. A comparison between the output of the each photo-diode can be used to determine a solar elevation (otherwise known as zenith) and an azimuth angle.

The controller 140 further receives input from a global positioning system (GPS) receiver 180. GPS is a space-based satellite navigation system that provides location and time information in all weather conditions, anywhere on or near the Earth where there is an unobstructed line of sight to four or more GPS satellites. The GPS receiver 180, based upon the signals from the GPS satellites, can calculate an accurate location of the vehicle. Using the location of a vehicle, vehicle driving direction information, and the time information, sun elevation angle and sun azimuth angle can be determined.

The controller 140 may further receive input from a memory 190. The memory 190 may be any non-volatile memory, including, but not limited to, a hard disk drive, flash memory, read only memory, or optical drive. In one embodiment, for example, the memory 190 may be a cloud based memory remote from the vehicle and accessed by a communication system (not illustrated). The memory 190 stores vehicle geometry data. The vehicle geometry data includes the dimensions and relative position of the windshield of the vehicle, the side windows, the rear window, sunroof, convertible roof, the seats of the vehicle, and the solar sensor, either single-zone solar sensor 160 or multi-zone solar sensor 170. In addition, the vehicle seats can be movable, and the vehicle seats may have variable multi-dimensional coordinate points. In one embodiment, for example, the vehicle geometry data may be measured and stored in the memory 190 in advance, such as at the factory.

As discussed in further detail below, the controller 140, based upon the data from one or more of the user interface 150, the single-cell solar sensor 160 and the GPS receiver 180 or the multi-cell solar sensor 170, and the memory 190, determines which seats of the vehicle 100 are directly exposed to solar rays and calculates the solar load on the interior of the vehicle, to control the temperature, airflow and air distribution output from the climate control system 110 to maintain the selected temperature which is determined based upon the user input.

Figure 2:
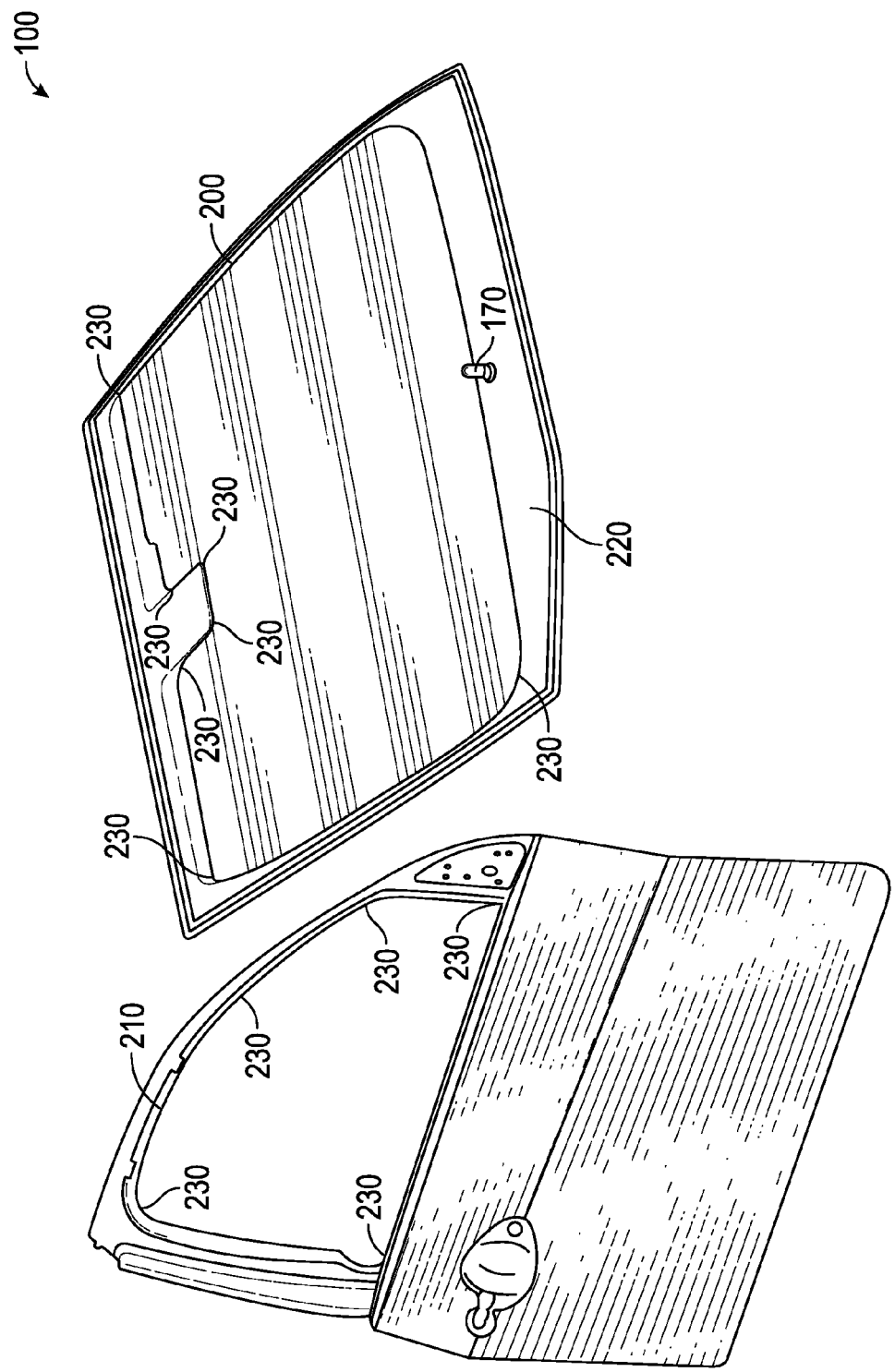
FIG. 2 is a partial perspective view of a vehicle, in accordance with an embodiment.

FIG. 2 is a partial perspective view of a vehicle 100, in accordance with an embodiment. The vehicle includes a windshield 200 and at least one side window 210. The solar sensor 160/170 is positioned on a dashboard 220 of the vehicle 100. As discussed above, the memory 190, illustrated in FIG. 1, stores vehicle geometry data. In one embodiment, for example, the memory 190 may store a series of multi-dimensional coordinate points 230. In one embodiment, for example, each multi-dimensional coordinate point 230 may be measured relative to the position of the solar sensor 170. In other words, the position of the solar sensor may be (0, 0, 0) and each other multi-dimensional coordinate point 230 is measured relative therefrom.

Figure 3:
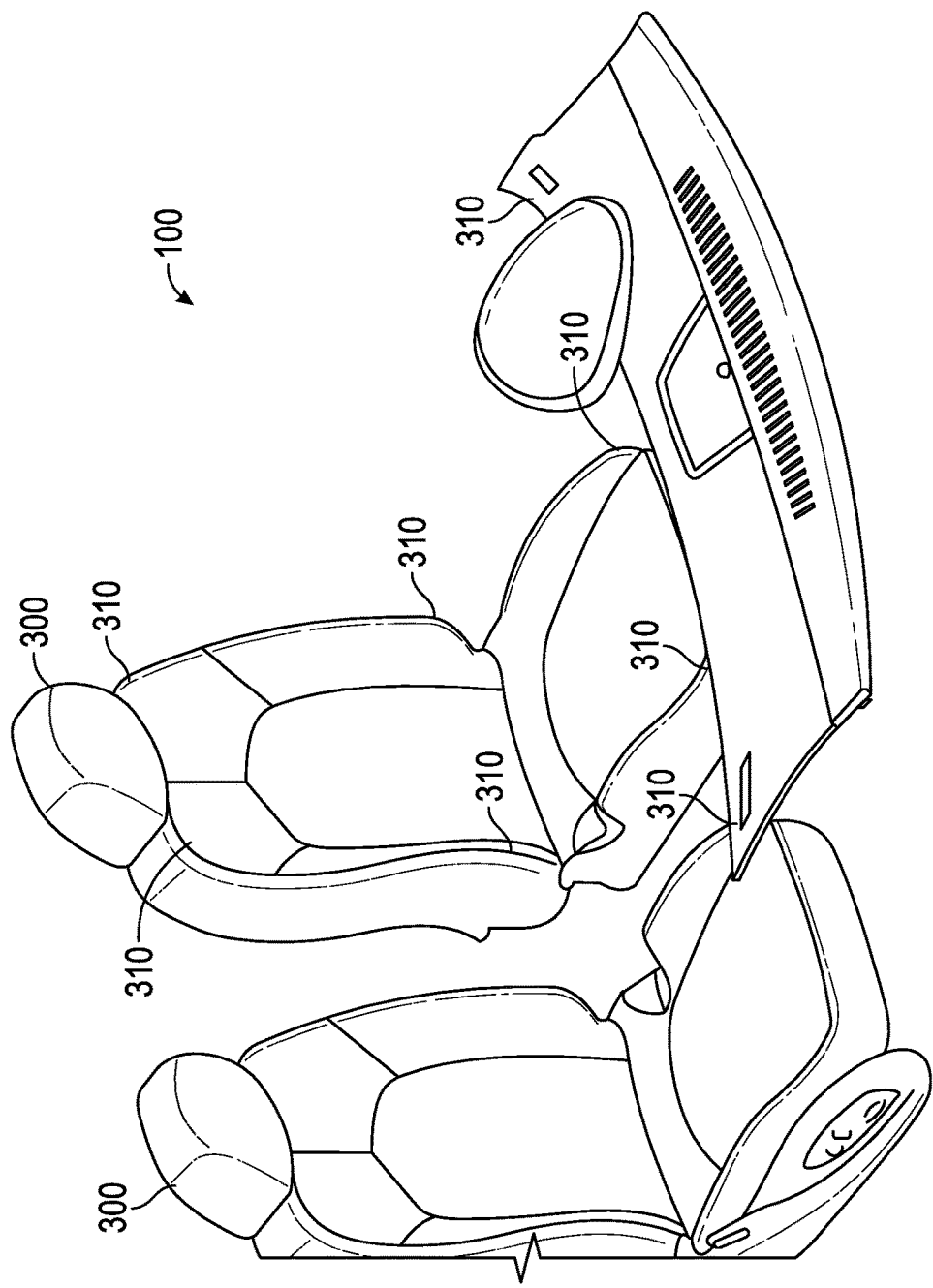
FIG. 3 is a partial perspective view of an interior of a vehicle, in accordance with an embodiment.

FIG. 3 is a partial perspective view of an interior of a vehicle 100, in accordance with an embodiment. The interior of the vehicle 100 includes multiple seats 300. As with the windshield and other windows of the vehicle 100, multi-dimensional coordinate points 310 corresponding to the position of the seats 300 relative to the position of the solar sensor 170 are determined. In one embodiment, for example, the multi-dimensional coordinate points 310 of the vehicle seats 300 may be variable. The seats 300 of the vehicle may be movable in multiple dimensions. In other words, the seats could be brought forwards or backward, raised or lowered. An angle of the seat back relative to the seat bottom may also be variable. The seats could be adjusted manually or electronically via a power seat system (not illustrated). In one embodiment, for example, the position of the various components of the seat may be tracked by the power seat system. In other embodiments, for example, position sensors or cameras could track the position of the vehicle seats. The position of the seats could be reported to the controller 140 directly, or stored in the memory 190.

Figure 4:
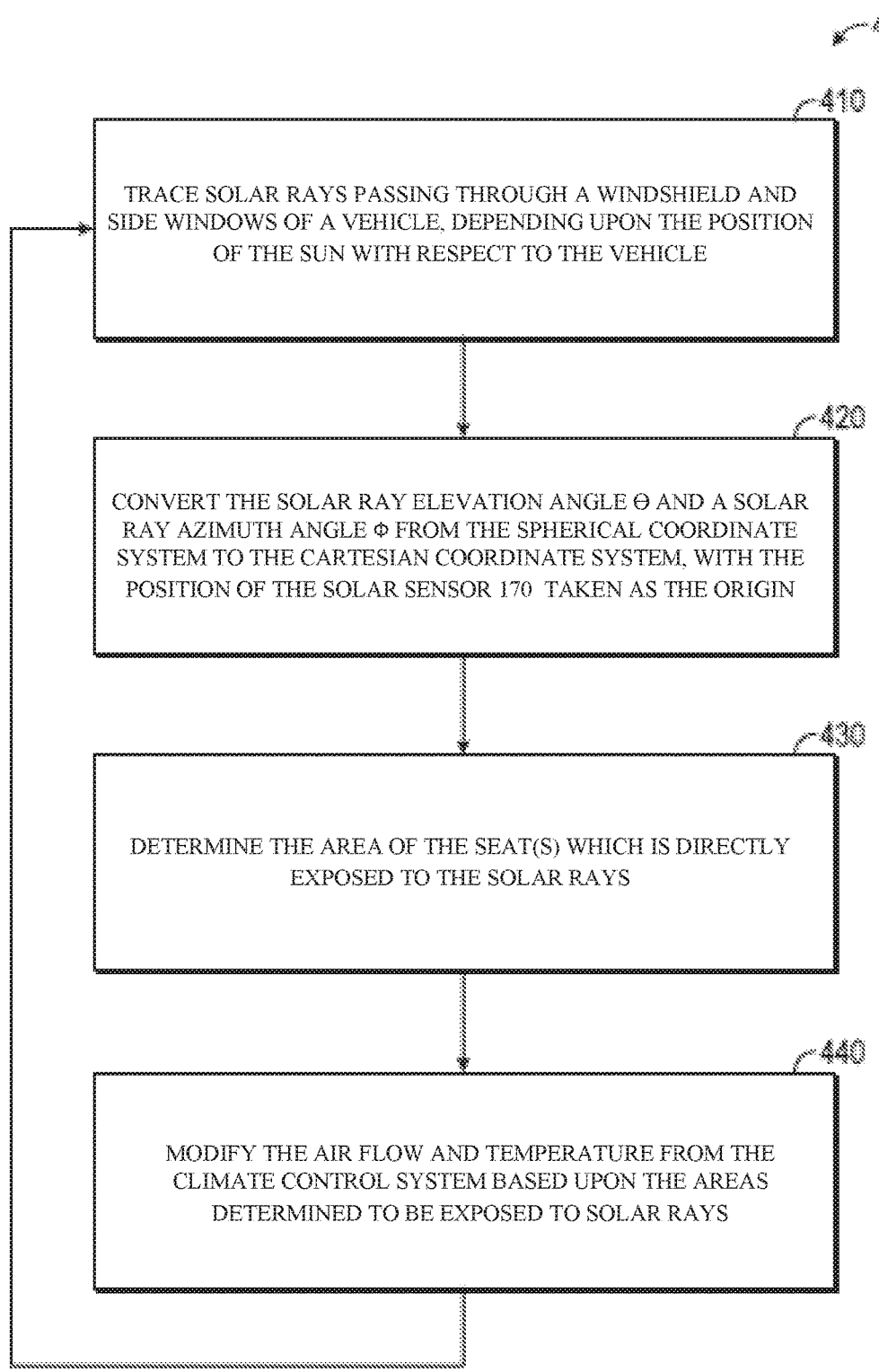
FIG. 4 is a flow chart illustrating a method for controlling a climate control system, in accordance with an embodiment.

FIG. 4 is a flow chart illustrating a method 400 for controlling a climate control system, in accordance with an embodiment. A controller, such as the controller 140 illustrated in FIG. 1, first traces solar rays passing through a windshield and side windows of a vehicle, depending upon the position of the sun with respect to the vehicle. (Step 410). In other words, the controller determines a path through the windshield and other windows of the vehicle that direct solar rays are travelling upon. The relative position information is based upon an elevation angle θ and a given azimuth angle Φ which may be based upon the data from a multi cell solar sensor or GPS information from a GPS receiver. The solar ray elevation angle θ corresponds to an angle of the traced solar ray relative to a horizon (i.e., the ground) and a zenith. The solar ray azimuth angle Φ corresponds to an angle of the solar ray relative to a reference vector, such as a vector corresponding to the vehicle driving direction.

The controller then converts the solar ray elevation angle θ and a solar ray azimuth angle Φ from the spherical coordinate system to the Cartesian coordinate system, with the position of the solar sensor 170 taken as the origin. (Step 420). A Cartesian coordinate (x, y, z) for a point P in the spherical coordinate system can be obtained by the following equations: $x = r \cos θ \cos Φ$, $y = r \cos θ \sin Φ$, $z = r \sin θ$, where r corresponds to the magnitude of a vector OP, where O is the origin corresponding to the solar sensor illustrated in FIG. 2. The intensity of the solar ray may be determined, for example, from a single-cell solar sensor, such as the sensor 160 or a multi-cell solar sensor, such as the sensor 170 illustrated in FIG. 1.

Figure 5:
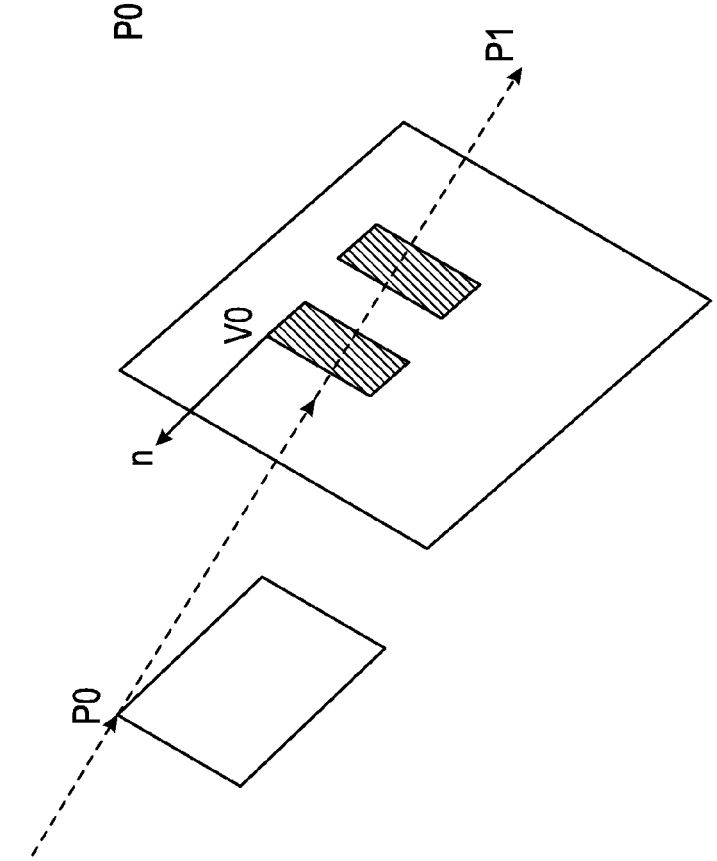

The controller then determines the area of the seat(s) which is directly exposed to the solar rays. (Step 430). The controller first determines an intersection of the solar rays with the planes corresponding to seat backrest and seat cushion of the vehicle. FIG. 5 is an illustration of the principals involved in this determination. Solar ray is depicted as a line L, starting from point P0 to P1 intersects a plane with a normal vector n and having the point V0 according to the following: A line L is determined according to: L: P0+r(P1−P0). An intersection of the line and the plane occurs at a point PI along the line L, where $r_1$=P1−P0 is determined according to equation 1:

$$r_I = \frac{n \cdot (V0 - P0)}{n \cdot (P1 - P0)} \qquad \text{(Equation 1)}$$

Here a.b is a dot product of vector a and vector b. Using an intersection criteria: $0 \le r_1 \le 1$ the controller determines the intersection point PI according to the following: PI=P0+$r_1$(P1−P0). When the denominator in Equation 1 is zero, the line L is parallel to the plane or is in the plane.

Figure 6:
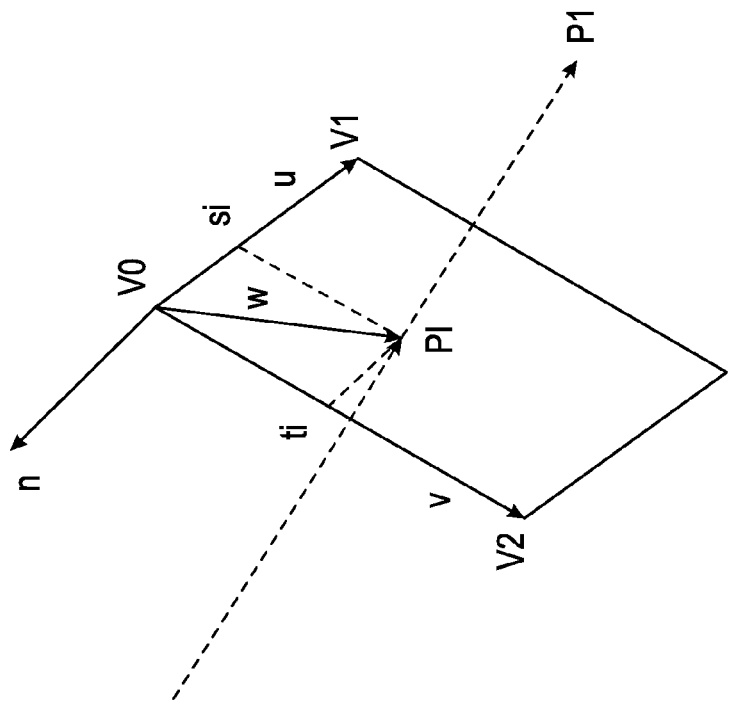
FIGS. 5-8 illustrate the calculations involved in determining an area of a seat exposed to solar rays, in accordance with an embodiment.

The controller then projects the plane(s) of solar rays coming through the various windows of the vehicle onto the planes corresponding to the seat backrest and seat cushions of the vehicle. FIG. 6 is an illustration of the principals involved in this determination. The controller follows an intersection of ray/line starting from the grid points of the various windows onto the respective plane of the vehicle component when traversed in the direction of solar rays. In one embodiment, for example, a parametric plane equation for defining the plane(s) of rays could be determined by the following: V(s, t)=V0+$s_I$(V1−V0)+$t_I$(V2−V0). The equation can be reduced to V(s, t)=V0+$s_I$u+$t_I$v, where u=V1−V0, v=V2−V0, w=PI−V0 illustrated in FIG. 6. Solving for w=$s_I$u+$t_I$v, $s_I$ and $t_I$ can be determined via the following equations:

$$s_I = \frac{(u \cdot v)(w \cdot v) - (v \cdot v)(w \cdot u)}{(u \cdot v)^2 - (u \cdot u)(v \cdot v)}$$

$$t_I = \frac{(u \cdot v)(w \cdot u) - (u \cdot u)(w \cdot v)}{(u \cdot v)^2 - (u \cdot u)(v \cdot v)}$$

Where intersection point PI is in the plane, if $0 \le s_I \le 1$, $0 \le t_I \le 1$. If $s_I<0$, $s_I>1$, $t_I<0$, or $t_I>1$, intersection point PI is outside the rectangular plane bounded by (V0,V1,V2). Here $s_I$ and $t_I$ are the relative weighing of intersection point on the line defined by (V0, V1) and the line defined by (V0, V2), respectively. Values of $s_I$ and $t_I$ in the range (0,1), indicates that the intersection point is bounded by line (V0, V1) and (V0, V2), respectively.

Figure 7:
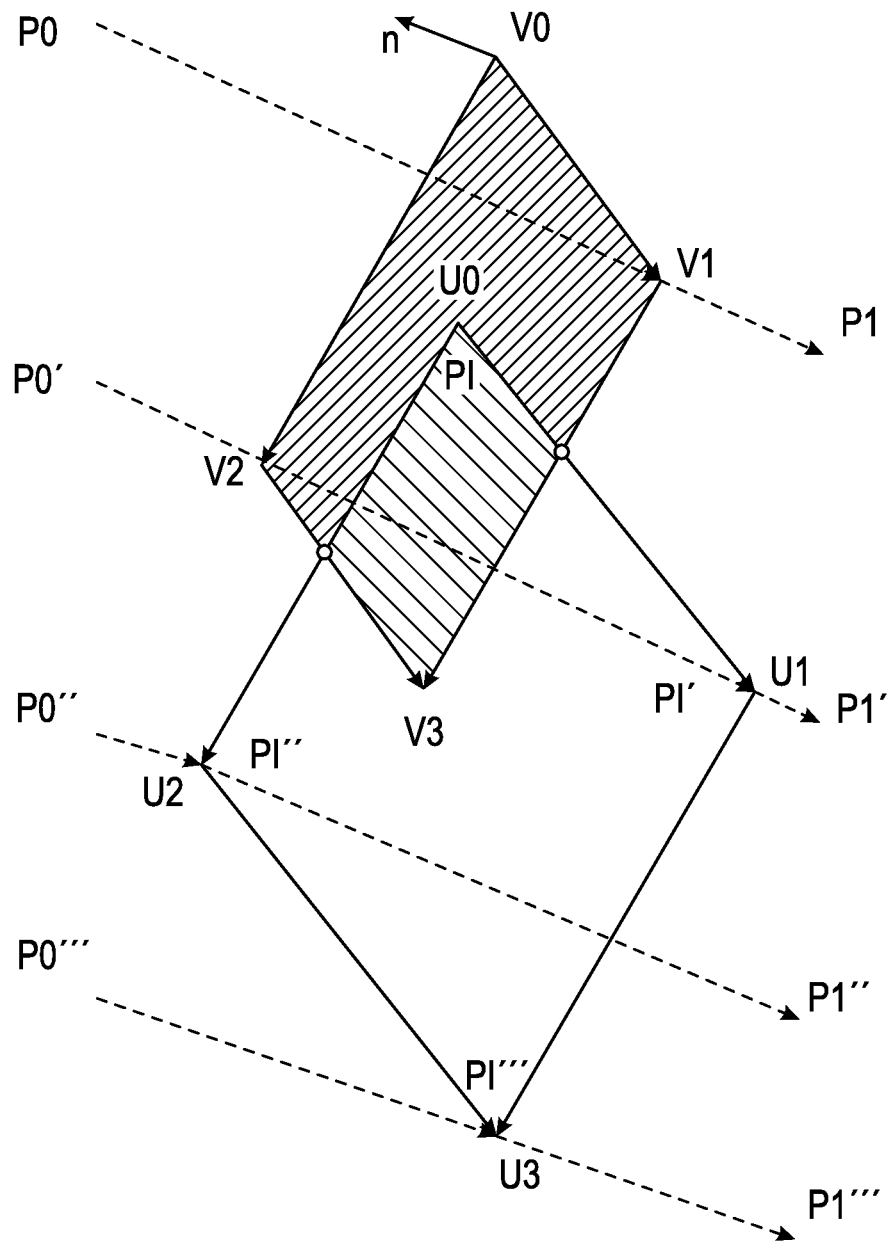

The controller then determines the exposed area of the seats or other vehicular components being monitored for solar rays. FIG. 7 illustrates the principals involved in finding the exposed area of the seats or other vehicular components being monitored for solar rays. Adjacent points of intersection of rays from grid points of the windows of a vehicle onto the seat plane are joined by lines. The intersection of these lines and the vectors/lines joining grid points of the seats is then determined by the controller. In FIG. 7, intersection points PI, PI', PI", PI"', corresponding to the boundary lines of the projected solar plane, are denoted by U0, U1, U3, U4 and the grid points of the seat are denoted by V0, V1, V2, V3. The intersection of the lines of the projected solar plane and the planes corresponding to the seats or other vehicular components being monitored for solar rays can be determined by the following equations:

$$s_I^P = \frac{((V1-V0) \times (U0-V0)) \cdot ((U1-U0) \times (V1-V0))}{((V1-V0) \times (U1-U0))^2}$$

$$t_I^P = \frac{((U1-U0) \times (U0-V0)) \cdot ((U1-U0) \times (V1-V0))}{((V1-V0) \times (U1-U0))^2}$$

where an intersection point is used, if $0 \le s_I^P \le 1, 0 \le t_I^P \le 1$. $s_I^P$ and $t_I^P$ are indeterminate (zero divided by zero) if the two lines are parallel.

Figure 8:
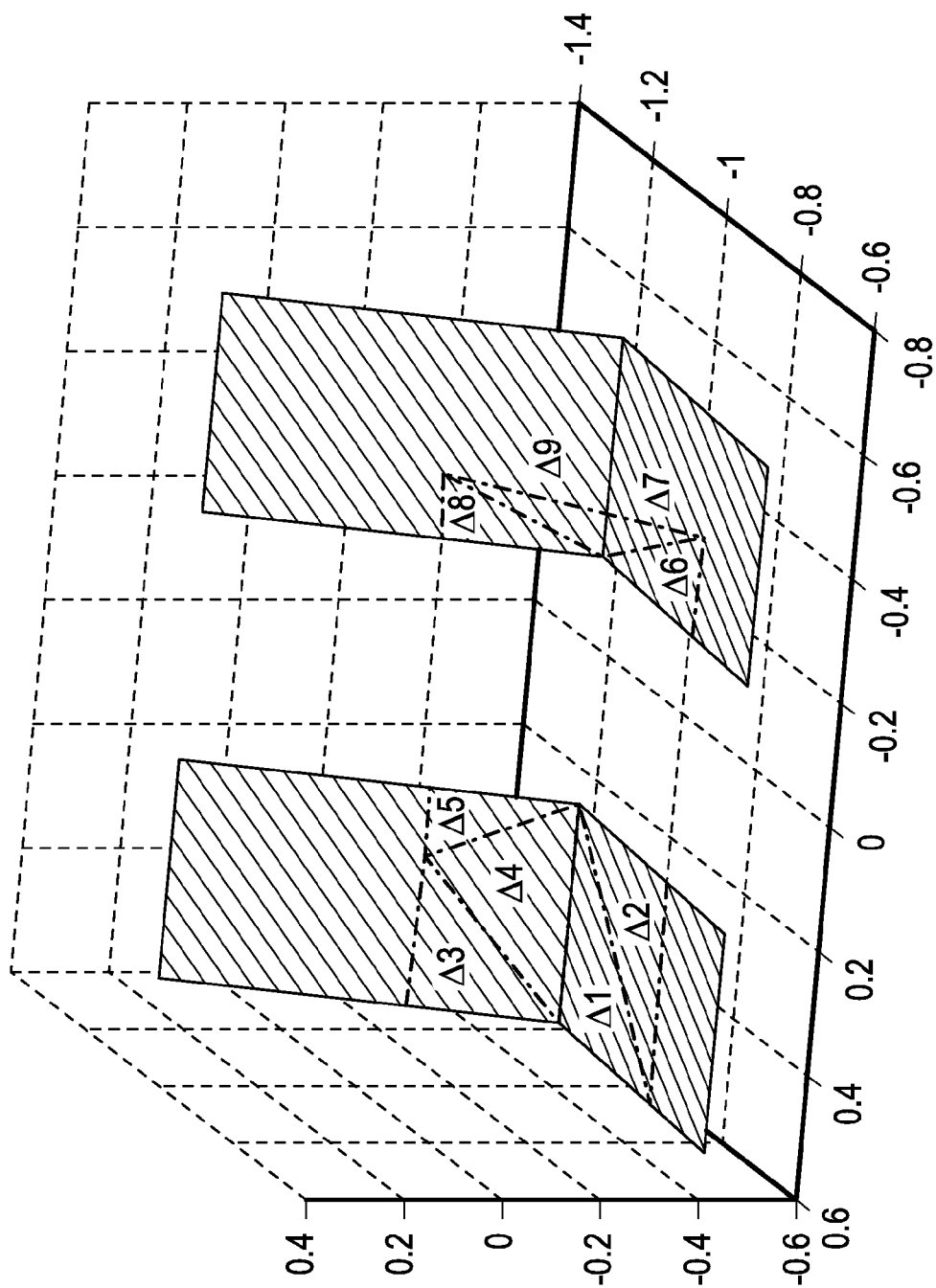

Once the intersection points are determined, the controller can calculate the area of the seats or other vehicle components exposed to the solar rays. In one embodiment, for example, the controller may divide exposed areas of the seats to the solar rays into triangles to calculate the total area of exposure for a given azimuth angle and a given elevation angle. Disuniting the polygonal exposed area of the seats or other vehicle components to the solar rays into triangle is easy for calculation of the total exposed area and is also accurate. This principle is illustrated in FIG. 8. The area of each triangle is calculated and the sum of areas of triangles is calculated to determine total area of exposure of each seat to the solar rays.

Figure 9:
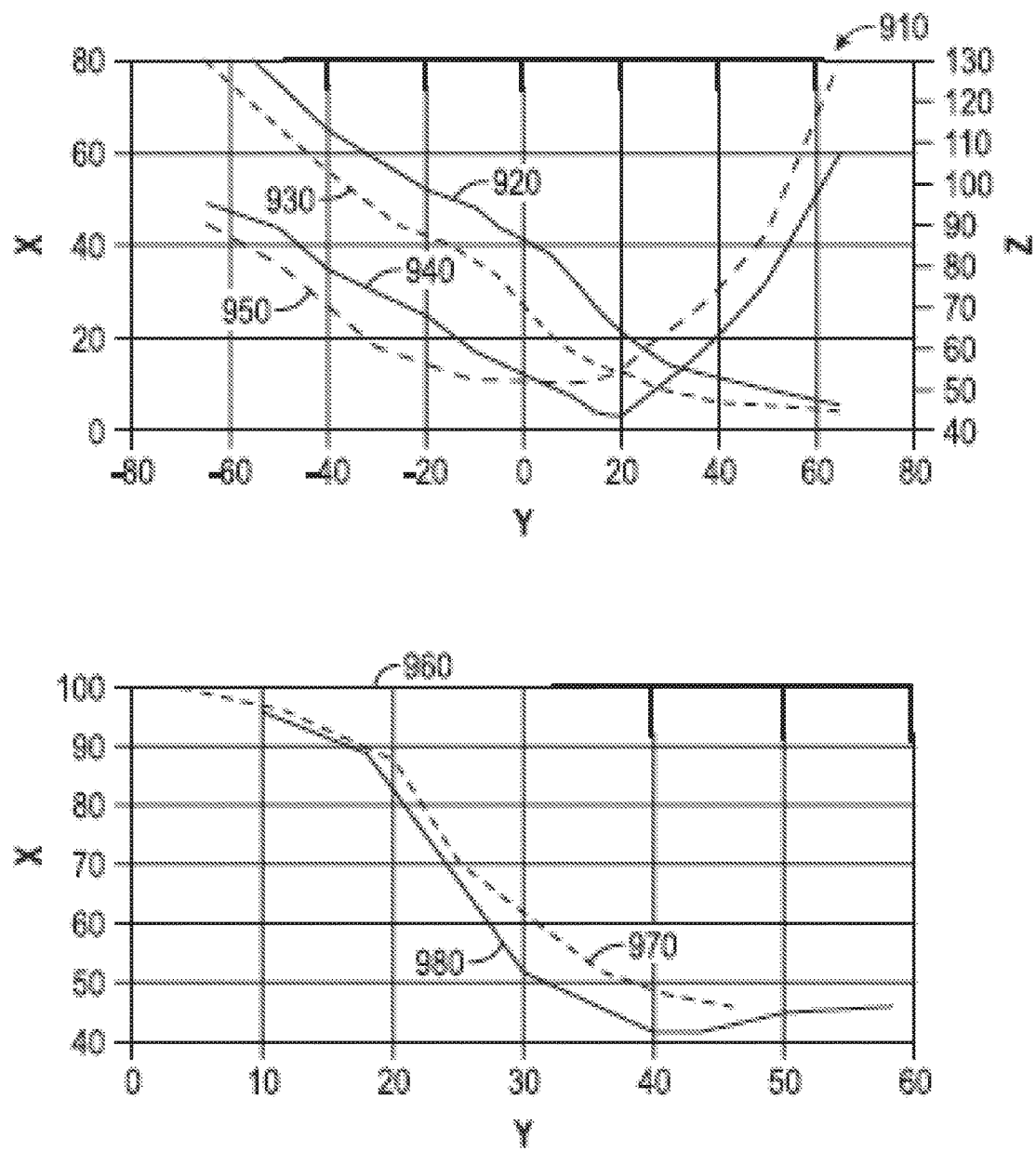
FIG. 9 illustrates an exemplary air flow, temperature and air distribution, in accordance with an embodiment.

The controller then modifies the air flow, temperature and air distribution from the climate control system based upon the areas determined to be exposed to solar rays. (Step 440). In one embodiment, for example, a percent directional sun effect for each occupant is calculated using the solar intensity (obtained from a solar sensor), glass transmissivity (a property of a glass could be obtained, for example, from the glass manufacturer), and the exposed area of the seats as follows.

$$\% \text{ Directional Sun Effect} = \frac{A_e}{A_{comp}} \frac{\lambda_g I_{solar}}{I_{max}}$$

Where $A_e$ and $A_{comp}$ are the exposed area and total area of the seat or other vehicle component to be monitored for solar rays, respectively, $\lambda_g$ is the transmissivity of the vehicle glass, and $I_{solar}$ and $I_{max}$ are the measured solar intensity and the maximum expected solar intensity. A ratio of the exposed area, $A_e$ and the total area of the seat, $A_{comp}$ is used to calculate percent exposure of the seat/occupant. The directional sun effect determined from the solar intensity, glass transmissivity and the percent exposure of the seat/occupant are used to change the duct outlet temperature, air flow and distribution of air inside the passenger compartment space to counteract the heat load from solar radiation, as illustrated in FIG. 9. In one embodiment, for example, the controller lowers the duct temperature, increases the airflow, and directs the air to the vent duct outlets when the seat or other area of the vehicle being monitored which corresponds to the duct has a larger directional sun effect. As seen in FIG. 9, a first graph 910 illustrates a duct air temperature in Celsius on the X axis, an outside air temperature in Celsius on the Y axis and an air flow in liters per second on the Z axis. The line labeled 920 corresponds to an exemplary duct temperature output when there is a 100% directional sun effect. The line labeled 930 corresponds to an exemplary duct temperature output when there is a 0% directional sun effect. The line labeled 940 corresponds to an exemplary air flow when there is a 0% directional sun effect. The line labeled 950 corresponds to an exemplary air flow when there is a 100% directional sun effect. In the graph labeled 960, the X axis corresponds to a percent of air distribution and the Y axis corresponds to a duct temperature in Celsius. The line 970 corresponds to a percent air distribution when there is a 100% directional sun effect. The line 980 corresponds to a percent air distribution when there is a 0% directional sun effect.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   at least one seat;
   a climate control system; and
   a controller communicatively coupled to the climate control system, wherein the controller is configured to:
   calculate a solar load for each of the at least one seat based upon a calculated exposed area of each of the at least one seat, the calculated exposed area determined by:
   tracing a solar ray;
   determining an intersection point of the solar ray with a plane corresponding to one of the at least one seat;
   determining a plane corresponding to direct solar exposure based upon the determined intersection point; and
   calculating the exposed area of each of the at least one seat based upon an overlap of the plane corresponding to the one of the at least one seat and the plane corresponding to direct solar exposure; and
   modify at least one of an airflow, a temperature and air distribution of the climate control system based upon the calculated solar load for each of the at least one seat.

2. The vehicle of claim 1, wherein the controller is further configured to trace the solar ray based upon a solar elevation and an azimuth angle.

3. The vehicle of claim 1, further comprising a memory communicatively coupled to the controller, wherein the memory is configured to store coordinates corresponding to each of the at least one seat and coordinates corresponding to windows of the vehicle and the controller is further configured to determine the plane corresponding to the one of the at least one seat and the plane corresponding to direct solar exposure based upon the stored coordinates.

4. The vehicle of claim 3, wherein the at least one seat is movable, and the controller is configured to update coordinates corresponding to the at least one seat in the memory based upon a position of the at least one seat.

5. The vehicle of claim 1, wherein the controller is further configured to calculate the solar load for each of the at least one seat based upon a solar intensity and a glass transmissivity of a window of the vehicle.

6. The vehicle of claim 5, further comprising:
   a solar sensor communicatively coupled to the controller; and
   a global positioning system receiver communicatively coupled to the controller,
   wherein the controller is configured to determine the solar intensity based upon data from the solar sensor and the global positioning system receiver.

7. A climate control system for a vehicle, comprising:
   a controller configured to:
   calculate a solar load for at least one seat based upon a calculated exposed area of each of the at least one seat by:
   tracing a solar ray;
   determining an intersection point of the solar ray with a plane corresponding to each of the at least one seat;
   determining a plane corresponding to direct solar exposure based upon the determined intersection point; and
   calculating the exposed area of each of the at least one seat based upon an overlap of the plane corresponding to the respective seat and the plane corresponding to direct solar exposure; and
   modify at least one of an airflow, a temperature and air distribution output from one of a heating system and a air conditioning system based upon the calculated solar load for each of the at least one seat.

8. The climate control system of claim 7, wherein the controller is further configured to trace the solar ray based upon a solar elevation and an azimuth angle.

9. The climate control system of claim 7, further comprising a memory communicatively coupled to the controller, wherein the memory is configured to store coordinates corresponding each of the at least one seat and coordinates corresponding to windows and the controller is further configured to determine the plane corresponding to the respective seat and the plane corresponding to direct solar exposure based upon the stored coordinates.

10. The climate control system of claim 7, wherein the controller is further configured to calculate the solar load for each of the at least one seats based upon a solar intensity and a glass transmissivity of a window.

11. The climate control system of claim 10, further comprising:
    a solar sensor communicatively coupled to the controller; and
    a global positioning system receiver communicatively coupled to the controller,
    wherein the controller is configured to determine the solar intensity based upon data from the solar sensor and the global positioning system receiver.

* * * * *